United States Patent [19]
Del Nero

[11] 3,931,093
[45] Jan. 6, 1976

[54] THERMOSETTING COMPOSITIONS OF A POLY(ARYLACETYLENE) AND A PHENOLALDEHYDE RESIN

[75] Inventor: Joseph Henry Del Nero, West Chester, Pa.

[73] Assignee: Hercules Incorporated, Wilmington, Del.

[22] Filed: Feb. 24, 1975

[21] Appl. No.: 552,522

[52] U.S. Cl. .................. 260/33.6 UA; 260/30.4 R; 260/32.8 R; 260/33.2 R; 260/47 UA; 260/80 P; 260/88.2 C; 260/93.5 R; 260/94.1; 260/838; 260/848
[51] Int. Cl.² .................. C08K 5/01; C08L 61/00
[58] Field of Search...... 260/848, 94.1, 838, 93.5 R, 260/47 UA, 80 P, 88.2 C, 33.6 UA

[56] References Cited
UNITED STATES PATENTS
3,705,131  12/1972  Korshak et al................. 260/47 UA
3,748,305   7/1973  White et al. .................. 260/47 UA

*Primary Examiner*—Melvyn I. Marquis
*Assistant Examiner*—H. H. Fletcher
*Attorney, Agent, or Firm*—John W. Whitson

[57] ABSTRACT

The invention relates to poly(arylacetylene) thermosetting compositions and thermoset resins prepared therefrom. The thermosetting compositions comprise a polyacetylenically unsaturated prepolymer and a phenol-aldehyde resin. The prepolymer is a polymer of at least one polyacetylenically substituted aromatic compound, such as diethynylbenzene, and has a number average molecular weight of about 900 to about 12,000 and contains about 5 to about 20% by weight of terminal acetylenic groups. Typical phenolaldehyde resins are the resoles and novolacs.

12 Claims, No Drawings

THERMOSETTING COMPOSITIONS OF A POLY(ARYLACETYLENE) AND A PHENOLALDEHYDE RESIN

This invention relates to thermosetting compositions and thermoset resins therefrom, and more particularly to such compositions and resins derived from acetylenically substituted aromatic compounds. The thermoset resins have exceptional oxidative thermal stability, and the invention also relates to the preparation of these resins.

One of the major disadvantages of the previously known high temperature resistant resins is their inability to be molded into desired shapes by conventional methods due to their poor flow characteristics. This disadvantage has been obviated by the discovery of a new class of arylacetylene polymers and thermosetting compositions containing them. These polymers and compositions are described in the copending application of Harold Jabloner, Ser. No. 262,166, filed June 12, 1972. The thermosetting compositions of the Jabloner application have excellent melt flow properties and can be molded or otherwise shaped without gas evolution, hence, after forming into the desired shape, they can be cured simply by heating, and this operation need not be carried out under pressure, since there also is no gas evolution during the curing step. In addition to being readily molded, these thermosetting compositions also are useful in other shaping or related operations, such as coating, casting, potting and impregnating operations. On being cured, the compositions provide thermoset resins having excellent thermal stability. Nevertheless, it was recognized that for certain end use applications it would be desirable for the resins to have even greater oxidative thermal stability and retention of physical properties after prolonged exposure to high temperatures.

Now, in accordance with this invention, thermosetting compositions have been discovered which make it possible to impart to the above resins a markedly improved oxidative thermal stability. The thermosetting compositions of this invention comprise from about 10 to about 50% by weight of a phenol-aldehyde resin and from about 50 to about 90% by weight of a polymer composition comprising a prepolymer of at least one polyacetylenically substituted aromatic compound, said prepolymer having a number average molecular weight of from about 900 to about 12,000, a ratio of aromatic protons to olefinic protons greater than about 2.4 and containing from about 5 to about 20% terminal acetylenic groups by weight of the prepolymer. The amount of phenol-aldehyde resin preferably is from about 10 to about 25% by weight of the thermosetting composition, and the corresponding amount of the polymer composition is from about 75 to about 90% by weight of the thermosetting composition. The polymer composition preferably contains a fluidizer for the prepolymer component.

The thermoset resins obtained by curing the thermosetting compositions of this invention are characterized by being essentially free of aliphatic unsaturation and predominantly aromatic in structure. These thermoset resins are further characterized by having a flexural strength of at least about 3000 p.s.i. and a flexural modulus of at least about 300,000 p.s.i. (ASTM No. D-790-70). These resins also are characterized by retaining at least about 50% of said flexural modulus up to a temperature of at least about 250°C. in air, retaining at least about 90% of their weight when a 30 mil thick sheet of the resin is aged in air at 260°C. for 350 hours and losing less than about 15% of their weight when a 30 mil thick sheet of the resin is heated to 500°C. at a rate of 10°C. per minute in air.

The thermoset resins of this invention are prepared by a two stage process. There is prepared, in the first stage, a polymer composition comprising a polyacetylenically unsaturated prepolymer from a polyacetylenically substituted aromatic compound, and there preferably is incorporated into this composition a fluidizer for the prepolymer. In the second stage, the polymer composition is combined with a phenol-aldehyde resin and the resulting thermosetting composition is fabricated and heated, whereby resinification takes place. By this means it is possible to produce thermoset resins in any desired shape, since those thermosetting compositions containing the prepolymer, a fluidizer for the prepolymer and the phenol-aldehyde resin are readily formed into any desired shape, and these molded, or otherwise formed, articles can then be cured by heating and will retain their shape.

PREPARATION OF THE PREPOLYMER

As just mentioned, the first stage in the preparation of the thermoset resins of this invention involves the formation of a prepolymer from at least one polyacetylenically substituted aromatic compound. The polyacetylenically substituted aromatic compound used to prepare these prepolymers can be any aromatic compound containing two or more acetylene groups, i.e., two carbons linked by a triple bond, attached to the same aromatic ring or to different aromatic rings in the compound, or mixtures of such compounds. The acetylenic groups can be internal, i.e., acetylene groups of the type aryl-C ≡ C-aryl, or they can be external, i.e., ethynyl groups of the type aryl-C ≡ C-H, or both types can be present in the polyacetylenic compound. Those compounds containing at least one external acetylenic group are preferred since these are the most reactive. Generally those compounds containing only internal acetylenic groups are used in admixture with a compound containing at least one ethynyl group. Exemplary of the polyacetylenically substituted aromatic compounds are m- and p-diethynylbenzenes; diethynyl toluenes; diethynyl xylenes; 9,10-diethynylanthracene; diethynylbiphenyl; 9,10-diethynylphenanthrene; 4,4'-diethynyl-transazobenzene; di(ethynylphenyl)ether; 2,3,5,6-tetrachloro-1,4-diethynylbenzene; diphenyldiacetylene (i.e., diphenylbutadiyne); dibenzyl-diacetylene; di-p-tolyldiacetylene; di-α-naphthyldiacetylene; 1-chloro-2,5-diethynylbenzene; 2,2'-dichlorodiphenyldiacetylene; 4,4'-dichlorodiphenyldiacetylene; 4,4'-dibromodiphenyldiacetylene; 1,4-bis(phenylethynyl)benzene; 1,3-bis(phenylethynyl)benzene; 9,10-bis(phenylethynyl)anthracene; 1,3,5-triethynylbenzene; 1,2,4-triethynylbenzene; 1,3,5-tris-(phenylethynyl)-2,4,6-triphenylbenzene; 1,2,4-tris(phenylethynyl)-3,5,6-triphenylbenzene; tris(ethynylphenyl)benzene, etc. Monoacetylenically substituted aromatic compounds such as, for example, phenylacetylene, biphenylacetylene and diphenylacetylene, may be used in admixture with the polyacetylenically substituted aromatic compound in the preparation of the prepolymers.

Representative of such an admixture is that of diethynylbenzene with phenylacetylene. The diethynylbenzene component may be m-diethynylbenzene, p-diethynylbenzene or mixtures thereof. The phenylacetylene component enters the resulting copolymer at approximately one-half the rate of the diethynylbenzene component. Thus, considerable variation in the composition of the reaction mixture is possible in producing copolymers containing from about 10 to about 45% by weight of phenylacetylene-derived units. The resulting copolymers, preferably combined with a fluidizer for the prepolymer, and then combined with a phenol-aldehyde resin, can be cured to provide thermoset resins having the prescribed high temperature oxidation resistance properties. Additionally, these resins show the same range of flexural strength and flexural modulus as the corresponding resins prepared from the diethynylbenzene homopolymers.

The prepolymerization reaction is carried out by heating the polyacetylenically substituted aromatic compound with an aromatization catalyst. The reaction can be carried out in bulk or in the presence of an inert diluent. Any inert diluent can be used, as, for example, ethers such as 1,2-dimethoxyethane, dioxane and tetrahydrofuran, ketones such as acetone, or aromatic hydrocarbons such as benzene, toluene, xylene, etc. The amount of diluent used is not critical and generally will be such as to form a concentration of the polyacetylenically substituted aromatic compound in the diluent of from 2 to 50%. Obviously, larger amounts can be used.

Any aromatization catalyst can be used to effect the desired cyclization reaction. By the term aromatization catalyst is meant a catalyst that promotes the formation of an aromatic ring by the cyclization of three acetylene groups. Preferred aromatization catalysts are nickel catalysts such as nickel bis(acrylonitrile), nickel bis(acraldehyde), nickel carbonyl bis(triphenylphosphine), nickel cyanide bis(triphenylphosphine) and nickel acetylacetonate in combination with triphenylphosphine, the Group IV-B metal halides such as titanium tetrachloride in combination with diethylaluminum chloride, and the Group V-B metal halides such as the niobium pentahalides and tantalum pentahalides. The amount of the catalyst used can be varied widely but generally will be from about 0.5 to about 5% of the monomer by weight.

The polymerization is carried out by heating the polyacetylenic monomer, or mixtures of monomers, with the catalyst to a temperature of from about 55°C. to about 250°C. and more preferably from about 80°C. to about 150°C. Preferably the reaction is carried out in an inert atmosphere.

In carrying out the process, it is essential to stop the reaction prior to complete conversion of the monomer. If the reaction is allowed to go to completion, the product is an insoluble, infusible material that cannot be plastic formed, nor can it be fluidized with a fluidizer and then plastic formed. Hence, the reaction is generally stopped at a monomer conversion above about 30% and below about 90%, and preferably at a monomer conversion of from about 50 to about 90%. By so doing, it is possible to produce a prepolymer having a number average molecular weight of from about 900 to about 12,000, avoid the production of very high molecular weight materials which are of essentially no use in the production of plastic formed articles, and at the same time retain in the prepolymer at least about 5%, and preferably about 5 to 20%, terminal acetylene groups by weight of the prepolymer for reaction in the second stage of the thermoset resin preparation. The prepolymers are soluble in aromatic hydrocarbons, ketones and ethers.

The method by which the prepolymerization reaction is stopped and the prepolymer is isolated will, of course, depend in large measure on the method used in preparing the prepolymer, the monomer or monomers used in its preparation, etc. If a monomer of comparatively high volatility is used in the preparation of the prepolymer, then any of such a monomer remaining in the prepolymer should be removed to avoid foaming and void formation in the plastic forming and curing steps used in the preparation of the thermoset resin in the second stage reaction. This removal can be effected by vacuum evaporation or steam distillation of the prepolymerization reaction mixture or the reaction mixture can be mixed with a diluent which is a solvent for the monomer and a non-solvent for the prepolymer. In the latter case, the prepolymer can be separated, as for example, by filtration, and the monomer, any prepolymer remaining in solution, and the diluents can be recovered and recycled in the process. Suitable diluents for precipitating the prepolymer are methanol, ethanol and isopropanol, and aliphatic hydrocarbons or mixtures thereof such as petroleum ether, pentane, hexane, heptane, etc.

The prepolymers used in accordance with this invention are unique polymers, and are described and claimed in the aforementioned Jabloner application. In contrast to the acetylene polymers of the prior art, the instant polymers can be used to prepare thermoset resins having the desirable properties described herein. It is well known that acetylene and substituted acetylenes, as for example, phenylacetylene, can be polymerized, but the polymers so produced are predominantly linear polymers which have appreciable olefinic or acetylenic unsaturation in the polymer chain. It is also known that aliphatic compounds containing two or more acetylenic groups can be polymerized, but again the polymer is linear and contains acetylenic unsaturation in the polymer chain. However, the instant prepolymers, prepared from a polyacetylene compound with an aromatization catalyst, differ from the prior art acetylene polymers in that they are predominately nonlinear in structure, at least 50% of the acetylenic unsaturation of the monomer having been converted during polymerization into aromatic structures. Furthermore, the unsaturation remaining in the prepolymer is chiefly acetylenic, which permits further polymerization in the second stage reaction, and the prepolymer has only a low degree of olefinic unsaturation. The acetylenic content of the prepolymer will preferably be from about 5 to about 20% by weight of the prepolymer. The low degree of olefinic unsaturation is important since the presence of a significant amount of such unsaturation can lead to thermal and oxidative instability of the final thermoset resin at high temperature. The formation of aromatic structures during polymerization contributes oxidation resistant and stable linkages.

The olefinic unsaturation of the prepolymer can be determined by a nuclear magnetic resonance method in which the number of hydrogen atoms attached to olefinic carbons, such hydrogens hereafter being referred to as olefinic protons, is compared with the number of hydrogen atoms attached to aromatic rings, such hydrogens hereafter being referred to as aromatic protons. The amount of acetylenic unsaturation can be determined by a similar technique comparing the ratio of hydrogens attached to acetylenic carbons, such hydrogens hereafter being referred to as acetylenic protons, with the aromatic protons. The prepolymer, to be useful in the preparation of the final thermoset resin, will, as stated above, have a ratio of aromatic protons to olefinic protons greater than about 2.4:1 and preferably greater than about 7.5:1.

In determining the ratio of acetylenic, aromatic and olefinic protons present in the prepolymer by the nuclear magnetic resonance method, deuterated acetone is used as a solvent. The areas under the peaks near 3.63 ppm., the peak at 7.48 ppm., and under the curve between 6.83 and 5.4 ppm. are proportional to the number of acetylenic, aromatic and olefinic protons, chemical shift values being measured versus an internal tetramethylsilane reference. The amount of acetylenic protons, and so the acetylene group concentration, is determined quantitatively by use of an internal standard, nitromethane,, added in accurate proportion to the prepolymer and giving a signal peak at 4.42 ppm.

PREPARATION OF THE THERMOSETTING COMPOSITION

The above-described prepolymers have high softening points and, in so far as many thermoforming techniques are concerned, the unfluidized thermosetting compositions of this invention may not have the flow properties required for plastic forming at temperatures below the cure temperature for these compositions. Therefore, it ordinarily is desirable in the practice of this invention to include a fluidizer for the prepolymer in the thermosetting composition, thereby making it possible to produce a composition that will have sufficient flow to permit plastic forming and that, when further heated after plastic forming, will cure to produce a thermoset resin.

The preferred type of fluidizer used in accordance with this invention is that represented by the acetylenic fluidizers disclosed in the aforementioned Jabloner application. These fluidizers are acetylenically substituted (mono- or poly-) aromatic compounds having a melting point below about 185°C. and a boiling point above about 250°C. or vapor pressure at 125°C. of less than about 20 mm. Representative of such acetylenic fluidizers are beta-naphthylacetylene, biphenylacetylene, 4-ethynyl-transazobenzene, diphenylacetylene, di-m-tolylacetylene, di-o-tolylacetylene, bis(4-ethylphenyl)acetylene, bis(3,4-dimethylphenyl)acetylene, bis(4-chlorophenyl)acetylene, phenyl benzoyl acetylene, betanaphthylphenylacetylene, di(alpha-naphthyl)acetylene, 1,4-diethynylnaphthalene, 9,10-diethynylanthracene, 4,4'-diethynylbiphenyl, 9,10-diethynylphenanthrene, 4,4'-diethynyl-transazobenzene, 4,4'-diethynyldiphenyl ether, 2,3,5,6-tetrachloro-1,4-diethynylbenzene, diphenylbutadiyne, di-p-tolyl-diacetylene, dibenzyl-diacetylene, 2,2'-dichlorodiphenyl diacetylene, 3,3'-dichlorodiphenyl diacetylene, di(alpha-naphthyl) diacetylene, diethynyldiphenyl butadiyne and tris(ethynylphenyl)benzene.

These fluidizer compounds may be used either individually or in admixture with each other. Other materials may be present in small amounts, if they do not detract from the desirable characteristics of the fluidizing compounds and if the mixture meets the specified physical properties requirements. For example, small amounts of volatile materials can be tolerated in mixtures with higher boiling materials without causing void formation in the compositions during cure. Also, higher melting materials can be tolerated in admixture with other compounds which will depress the melting point of the mixture to the desired temperature.

Just how the acetylenic fluidizer compound acts on the prepolymers to produce a plastic formable composition is not completely known. It is believed that in part it acts as a plasticizer, making it possible to shape the prepolymer, and in part that it undergoes a partial reaction with the prepolymer. In any event, such acetylenic fluidizers, unlike ordinary plasticizers, react with the prepolymer when the plastic formed composition is cured and hence become a part of the final thermoset resin.

The amount of acetylenic fluidizer incorporated in the polymer composition comprising the prepolymer can be varied over a wide range, but will generally be from about 2% to about 70% by weight of the prepolymer. Thus, when the polymer composition contains a fluidizer and this composition constitutes 50% of an unfilled thermosetting composition in accordance with this invention, the amount of fluidizer in the thermosetting composition will be from about 1 to about 21%, and the corresponding amount of prepolymer will be from about 49 to about 29%. Similarly, when the polymer composition containing a fluidizer constitutes 90% of an unfilled thermosetting composition, the amount of fluidizer in the thermosetting composition will be from about 2 to about 37%, and the corresponding amount of prepolymer will be from about 88 to about 53% by weight. Preferably, the amount of fluidizer will be from about 5 to about 40% by weight of the prepolymer.

The fluidizer can be incorporated in the polymer composition in a variety of ways. One of the simplest methods is to mix the prepolymer and fluidizer in a diluent that is a solvent for the two materials and which is preferably low boiling for ease in removing the diluent after the mixing operation. The mixing operation can be carried out at any convenient temperature, generally at room temperature. Suitable diluents for this purpose are methylene chloride, dichloroethane, acetone, methyl ethyl ketone, benzene, toluene, etc. Such diluents can be removed, after adequate mixing has been achieved, by evaporation, distillation, etc. On the other hand, if the monomer or monomers used for the preparation of the prepolymer have boiling points above about 250°C., the unreacted portion does not need to be removed from the prepolymer and can act as all or part of the fluidizer in the thermosetting composition.

The phenol-aldehyde resins of the compositions of this invention also can be combined in a number of ways with the polymer composition comprising the prepolymer. For example, the solvent technique just described for incorporation of the fluidizers may be used. This method can be particularly efficient if a fluidizer is employed, since both the fluidizer and the resin can be incorporated into the thermosetting composition at the same time. The phenolaldehyde resins also can be incorporated in the thermosetting composition by dry or melt blending techniques.

The phenol-aldehyde resins of the thermosetting compositions of this invention are well known in the art. They are prepared by the reaction of a phenol with an aldehyde, the first step in the reaction being the formation of methylol derivatives in the ortho or para positions of the phenol. In the presence of acid catalysts and with a mole ratio of aldehyde to phenol less than one, the methylol derivatives condense with the phenol to form fusible and soluble linear polymers of low molecular weight identified as novolacs, also known as two-step resins. These materials do not themselves react further to give cross-linked resins, but will do so on reaction with additional aldehyde sufficient to raise its mole ratio to the phenol above unity. Hexamethylene tetramine usually is used as the source of the additional aldehyde. In the presence of alkaline catalysts and with more than one mole of aldehyde per mole of the phenol, the initial methylol derivatives condense through formation of methylene and ether linkages to form fusible and soluble products containing residual alcohol groups. These products are known as resoles, and also as one-step resins, and, if the reaction leading to their formation is continued further, crosslinked products containing large numbers of phenolic nuclei are formed.

Also useful as the phenol-aldehyde resin component in the thermosetting compositions of this invention are the epoxy-modified novolacs, which ordinarily are prepared by the incomplete reaction of an epoxide such as epichlorohydrin with the phenolic hydroxyls of the novolac resin. The unreacted phenolic hydroxyls then provide basis for curing of the resin with a phenolic curing agent such as hexamethylene tetramine. Phenol itself is the preferred phenol used in preparation of the phenol-aldehyde resins, but alkyl-substituted phenols such as o-, m- and p-cresol and m- and p-tert-butylphenol also may be used. Also useful in certain instances are p-phenylphenol and resorcinol. Similarly, the preferred aldehyde is formaldehyde, although acetaldehyde, propionaldehyde, butyraldehyde and furfural may also be utilized.

There can also be incorporated in the thermosetting composition fillers, pigments, antioxidants and other desired additives. Such additives are readily incorporated at the time the other components of the thermosetting composition are combined with each other. Exemplary of the materials that can be incorporated are organic and inorganic fibrous materials such as graphite, glass, asbestos, metal, metal oxide, metal carbide, boron, boron carbide, boron nitride and silicon carbide fibers, and particulate reinforcements such as glass beads, metal oxides, metal carbonates, clay, talc, silica, diatomaceous earth, carbon, graphite, molybdenum sulfide and powdered fluorocarbon resins. The amount of filler incorporated in the thermosetting composition can be varied widely, but generally will be free from about 1 to about 95 percent by weight of the filled composition.

After effecting mixing of the components, the compositions so obtained can be divided by any desired means into suitable size pieces for subsequent fabrication operations. Alternatively, the compositions can be ground to fine powders and converted into pellets convenient for utilization in subsequent operations by compacting under pressure at room temperature of at a somewhat elevated temperature. These thermosetting compositions are stable and can be stored at room temperature.

FORMATION OF THE THERMOSET RESIN

The fluidized thermosetting compositions of this invention will flow on heating and remain sufficiently fluid so that the compositions can be shaped by conventional plastic forming such as extrusion, compression, transfer and injection molding, calendering, forging, etc. Thus, shapes such as sheets, pipes, rods and wire coatings can be made by extrusion. Sheets can in subsequent operations be further modified in form as by embossing or thermoforming. More complex shapes can be made by molding operations. Coatings can be prepared by application of solutions of the thermosetting compositions of this invention in solvents such as tetrahydrofuran.

The temperature employed in plastic forming and related operations can be varied widely, the preferred temperature being dependent on the amount of fluidizer when one is employed, the molecular weight of the prepolymer, the amount of the phenol-aldehyde resin, the type and amount of any filler or reinforcing agent present, the fabrication method, the pressure employed, and the amount of curing desired during the fabrication operation. Temperatures as low as about 40°C. can be used, or as high as 200°C., but generally will be within the range of from about 90°C. to about 165°C. As the heating continues above about 90°C., and generally at a pressure of from about 15 to about 15,000 p.s.i., the thermosetting composition resolidifies. In an operation such as extrusion, in which it may be desirable to recycle scrap material, low temperatures are employed to avoid much change in the flow properties of the composition during its fabrication. In other operations such as transfer or compression molding, it may be desirable to fabricate the material at an elevated temperature so that curing of the material occurs during the shaping operation.

The temperature at which the thermosetting composition is heated to effect further polymerization, which can be referred to as the curing operation, can be varied widely and will depend on such factors as the components of the thermosetting composition, the size and shape of the fabricated article, etc. In general, the conditions for effecting the cure will range from several hours at a temperature of about 100°C. to a few minutes at a temperature of about 300°C. Alternatively, a fabricated article can be used in its only partially cured form, and curing can be effected during use at an elevated temperature. During the curing operation, moderate pressure ordinarily will be applied to inhibit any void formation which might occur due to water or ammonia formed in the curing of the phenol-aldehyde resin component of the thermosetting composition.

The reaction that takes place during the curing of the thermosetting composition containing an acetylenic fluidizer involves a copolymerization reaction between the prepolymer and the acetylenic fluidizer, which reaction may effect some cross-linking of the prepolymer. Thus, the final thermoset resin can be defined as a copolymer of the prepolymer and the acetylenic fluidizer. In the case of a thermosetting composition containing no acetylenic fluidizer, the reaction during curing primarily is one of further polymerization of the prepolymer.

The thermoset resins so produced are hard, stiff, strong, abrasion resistant, infusible and insoluble. They retain strength, stiffness and insolubility at elevated temperatures, are stable to exposure at elevated temperatures for extended periods, and are resistant to oxidative attack at elevated temperature. They are resistant to chemical attack by strong acids and concentrated alkali and are resistant to swelling by organic solvents at elevated temperatures. As previously stated, these thermoset resins are characterized by having a flexural strength of at least about 3000 p.s.i. and a flexural modulus of at least about 300,000 p.s.i. The resins also are characterized by retaining at least about 50% of said flexural modulus in air up to a temperature of at least about 250°C., retaining at least about 90% of their weight when a 30 mil thick sheet is aged in air at 260°C. for 350 hours and losing less than about 15% of their weight when a 30 mil thick sheet is heated to 500°C. at a rate of 10°C. per minute in air. Obviously, these values can be greatly improved by the addition of fillers and other strengthening additives.

The new thermosetting compositions of this invention are useful as thermosetting binder resins for glass, carbon, asbestos, graphite, alumina, silicon carbide, boron nitride and boron fibers, and for particulate materials such as molybdenum sulfide and powdered fluorocarbon resins, and in the preparation of moldings to be used in high temperature environments, as for example, turbine blades for jet engines, aeroplane wing edges, ablative coatings for space reentry vehicles, bearings, grinding wheels, brake linings and clutch facings. The compositions also are useful as chemically resistant coatings and as temperature resistant adhesive and potting compounds.

The following examples will illustrate the preparation of the prepolymers, the thermosetting compositions and the thermoset resins of this invention. All parts and percentages are by weight unless otherwise indicated.

EXAMPLE 1

A polymerization vessel was charged with a mixture of 630 parts of meta-diethynylbenzene and 70 parts of para-diethynylbenzene dissolved in 3077 parts of anhydrous benzene. The solution was sparged with nitrogen and heated to reflux temperature. There then was added to the refluxing solution in four approximately equal increments a catalyst mixture prepared by mixing 4.7 parts of nickel acetylacetonate and 9.3 parts of triphenylphosphine in 50 parts of anhydrous benzene. After addition of the initial increment, the others were separately added one, two and three hours later. The solution was held at reflux temperature for a total of six and one-quarter hours, at which time the monomer conversion was 85.5%. The prepolymer then was precipitated by adding the solution to seven times its volume of petroleum ether and the yellow powder, separated by filtration, amounted to 406 parts. The prepolymer contained 11.8% acetylene groups.

EXAMPLE 2

The prepolymer used in this example was prepared by repeating the polymerization reaction of Example 1 several times. Monomer conversion in these reactions was in the range of 85–89%. The reaction mixtures then were added to approximately six times their total volume of heptane, and the precipitated prepolymer was recovered by filtration.

Molding compositions were prepared from 72.0 parts of the prepolymer, 18.0 parts of 1,4-diphenylbutadiyne as fluidizer and 10.0 parts of the designated phenol-aldehyde resin. The novolac and epoxy-modified novolac resins contained hexamethylene tetramine as the resin curing agent, the amount being approximately six to seven percent in the novolac resin. The components of each composition were dissolved in tetrahydrofuran, with thorough mixing, following which the tetrahydrofuran solvent was removed by evaporation using a rotary evaporator. The compositions then were ground, dried overnight at room temperature and finally dried for one hour at 55°C. at 5 mm. pressure. A composition containing only the prepolymer and the 1,4-diphenylbutadiyne in the indicated amounts was prepared in the same way.

The resulting compositions, as well as the phenolaldehyde resins themselves, then were formed into disks 30 mils thick and one inch in diameter by compression molding in a fully positive disk mold at 177°C. for five minutes under 7000 p.s.i. pressure. The molded disks subsequently were cured at atmospheric pressure for 18 hours at 200°C. These disks then were heated in a forced air oven at 230°C. The time, in hours, at this temperature to give 5 and 10% weight loss of the cured resin products is tabulated in Table I.

Table I

| Composition | Time to 5% Weight Loss | Time to 10% Weight Loss |
|---|---|---|
| 1. Prepolymer-fluidizer | 1700 | 2400 |
| 2. Novolac (Durez 19187) | 180 | 800 |
| 3. Prepolymer-fluidizer-novolac | 1600 | 3300 |
| 4. Epoxy-modified novolac | 130 | 600 |
| 5. Prepolymer-fluidizer-epoxy-modified novolac | 1550 | 3000 |
| 6. Resole (Durez 11078) | 460 | 1350 |
| 7. Prepolymer-fluidizer-resole | 1700 | 3400 |

It is apparent from the above data that, over extended periods of time, the presence of the phenol-aldehyde resin in compositions 3, 5 and 7 markedly improves the resistance of the prepolymerfluidizer composition (1) to oxidative weight loss.

In addition to the information given in Table I, it was observed that after 1900 hours at 230°C. each of the compositions (3, 5 and 7) containing a phenol-aldehyde resin showed no signs of cracking, indicating excellent thermal stability under oxidizing conditions. By way of contrast, the prepolymer-fluidizer composition (1) and each of the phenol-aldehyde resins themselves (2, 4 and 6) exhibited considerable cracking under the same conditions. It was further observed in obtaining the data set forth in Table I that the relationship between the weight loss values and the corresponding time values remained linear out to at least 10% weight loss for each of the compositions (3, 5 and 7) containing a phenol-aldehyde resin. On the other hand, such a straight line relationship did not exist in the case of the prepolymer-fluidizer composition (1) nor in the case of the phenol-aldehyde resins themselves (2, 4 and 6). These observations indicate that the phenol-aldehyde resins in the compositions containing them impart to the cured compositions an increased resistance to degradation on exposure to air at elevated temperatures.

EXAMPLE 3

Using the same components and following generally the procedure of Example 2, molding compositions were prepared, compression molded and cured. The resulting disks then were heated in a forced air oven at 260°C. The time, in hours, at this temperature to give 5 and 10% weight loss of the resin is given in Table II.

Table II

| Composition | Time to 5% Weight Loss | Time to 10% Weight Loss |
|---|---|---|
| 1. Prepolymer-fluidizer | 340 | 550 |
| 2. Novolac (Durez 19187) | 50 | 200 |
| 3. Prepolymer-fluidizer-novolac | 320 | 680 |
| 4. Epoxy-modified novolac | 60 | 300 |

Table II-continued

| Composition | Time to 5% Weight Loss | Time to 10% Weight Loss |
|---|---|---|
| 5. Prepolymer-fluidizer-epoxy-modified novolac | 640 | 1300 |
| 6. Resole (Durez 11078) | 50 | 240 |
| 7. Prepolymer-fluidizer-resole | 500 | 1000 |

It again is apparent, this time at an even higher temperature and at both 5 and 10% weight loss levels, that the presence of the phenol-aldehyde resin in compositions 3, 5 and 7 generally improves to a great extent the resistance of the prepolymer-fluidizer composition (1) to oxidative weight loss. It also was again observed that there was a linear relationship between the weight loss values and the corresponding time values out to at least 10% weight loss for the compositions (3, 5 and 7) containing the phenol-aldehyde resins, and that this relationship was nonexistent for the prepolymer-fluidizer composition (1) and for the phenol-aldehyde resins themselves (2, 4 and 6).

EXAMPLE 5

Using the same ingredients and following generally the procedure of Example 2, molding compositions were prepared, compression molded and cured. Small sections with approximately equal surface areas were then taken from each molded disk and subjected to dynamic thermogravimetric analysis at a constant heating rate of 10°C. per minute in an atmosphere of air to a final temperature of 700°C. Such dynamic heating conditions provide temperatures which are representative of those encountered at the surface of resin-bonded bearings, grinding wheels and brake linings. The weight retention values for each resin composition are tabulated in Table III. The data in this table establish that the percentage weight retention values for the prepolymer-fluidizerphenolic blends are consistently higher than would have been predicted from the linearly additive performance of the blend components. For example at 650°C., the expected weight retention for composition (4a) would be 29% whereas the observed value was 45%. This synergistic effect was entirely unexpected.

Table III

| | Composition | Weight % Phenolic | Temp. °C. | Weight Retention (%) | Temp. °C. | Weight Retention (%) | Temp. °C. | Weight Retention (%) | Temp. °C. | Weight Retention (%) |
|---|---|---|---|---|---|---|---|---|---|---|
| 1. | Prepolymer-fluidizer | 0 | 500 | 94.3 | 600 | 55–60 | 650 | 31–39 | 700 | 14–23 |
| 2a. | Resole phenolic | 100 | 500 | 79.5 | 600 | 54 | 650 | 23 | 700 | 2 |
| 3a. | Prepolymer-fluidizer and resole phenolic | 10 | 500 | 95.0 | 600 | 78 | 650 | 59 | 700 | 40 |
| 4a. | Prepolymer-fluidizer and resole phenolic | 50 | 500 | 89.5 | 600 | 71 | 650 | 45 | 700 | 19 |
| 2b. | Epoxy novolac | 100 | 500 | 80.0 | 600 | 59 | 650 | 34 | 700 | 8 |
| 3b. | Prepolymer-fluidizer and epoxy novolac | 10 | 500 | 95.5 | 600 | 76 | 650 | 51 | 700 | 34 |
| 4b. | Prepolymer-fluidizer and epoxy novolac | 50 | 500 | 88 | 600 | 69 | 650 | 42 | 700 | 16 |
| 2c. | Novolac Phenolic | 100 | 500 | 81.5 | 600 | 27 | 650 | 2 | 700 | 2 |
| 3c. | Prepolymer-fluidizer and novolac phenolic | 25 | 500 | 93.0 | 600 | 70 | 650 | 39 | 700 | 2 |
| 4c. | Prepolymer-fluidizer and novolac phenolic | 50 | 500 | 90.5 | 600 | 60 | 650 | 26 | 700 | 2 |

EXAMPLE 4

Molding compositions were prepared by grinding together 68.0 parts of the prepolymer of Example 2, 17.0 parts of 1,4-diphenylbutadiyne, and 15.0 parts of the novolac resin of Example 2 in the one case, and 15.0 parts of the resole resin of Example 2 in the other case.

These two compositions were then formed into disks 30 mils thick and cured as in Example 2. The resulting disks were heated in a forced air oven at 260°C. The times, in hours, at this temperature to give 5 and 10% weight loss of the resins were essentially identical to those times listed in Table II for the prepolymer-fluidizer-novolac and prepolymer-fluidizer-resole compositions. The same resistance to cracking described in Examples 2 and 3 was observed.

EXAMPLE 6

Molding compositions were prepared by dissolving only the prepolymer (no fluidizer) and the resole phenolic resin of Example 2 in tetrahydrofuran as the solvent, then precipitating the compositions by addition of water to the solvent solutions. Following precipitation, the molding compositions were dried, compression molding and cured as in Example 2. The prepolymer and the resole resin themselves were individually molded and cured. Sections of the molded disks were subjected to dynamic thermogravimetric analysis in air, as described in Example 5. The weight retention values for each resin composition are given in Table IV, and once again the values obtained for the blends were higher than would have been predicted from the linearly additive performance of the individual components.

Table IV

| | Composition | Weight % Phenolic | Temp. °C. | Weight Retention (%) | Temp. °C. | Weight Retention (%) | Temp. °C. | Weight Retention (%) | Temp. °C. | Weight Retention (%) |
|---|---|---|---|---|---|---|---|---|---|---|
| 1. | Prepolymer (unfluidized) | 0 | 500 | 95 | 600 | 42 | 650 | 22 | 700 | 10 |
| 2a. | Resole phenolic | 100 | 500 | 80 | 600 | 54 | 650 | 22 | 700 | 2 |
| 3a. | Prepolymer (unfluidized) and resole phenolic | 20 | 500 | 94 | 600 | 79 | 650 | 63 | 700 | 45 |
| 4a. | Prepolymer (unfluidized) and resole phenolic | 50 | 500 | 92 | 600 | 76 | 650 | 55 | 700 | 30 |

EXAMPLE 7

Following generally the procedures of Example 2, cured products corresponding to compositions (1), (6) and (7) of that example were prepared in the form of disks which were four inches in diameter and approximately one-fourth of an inch thick. The molded disks were cured by heating them at atmospheric pressure over a period of about 24 hours to a final temperature of 200°C.

The cured disks were conditioned at 72±2°F. and 50±2% relative humidity and then subjected to a standard abrasion test (Taber abrasion, ASTM D 1044) using a CS-17 wheel and a 1000-gram load. The tests were carried out to a sufficient number of cycles to establish, as nearly as possible, a linear weight loss rate. The data obtained are tabulated in Table V.

Table V

| | Composition | Relative Linear Weight Loss Rate |
|---|---|---|
| 1. | Prepolymer-fluidizer | 0.15 |
| 2. | Resole | 1.0 |
| 3. | Prepolymer-fluidizer and resole (10%) | 0.13 |

EXAMPLE 8

Following the procedure of Example 2, thermosetting compositions corresponding to compositions (1), (3) (5) and (7) of that example were prepared. Each composition, dissolved in methyl ethyl ketone as the solvent, was applied from solution onto the last half inch of the planar surface on one side of each of two aluminum (6061 T4) strips one inch in width and four inches in length. These strips had previously been degreased in trichloroethylene vapor, etched in chromic acid and dried. After evaporation of the solvent from the coated areas of the strips, the strips were joined by overlapping them at the coated areas, applying 50 to 100 p.s.i. pressure at the point of overlap and heating the assembly to 170°C. The bonded strips were then heated for one-half hour to a final temperature of 250°C. to cure the layer of composition acting to bond the strips to each other. The bonded specimens were then tested in tension according to the method of ASTM D 1002. The lap shear strengths provided by the various resin compositions are shown in Table VI.

Table VI

| | | Lap Shear Strength (lbs./inch) | Specimen Failure Mode |
|---|---|---|---|
| 1. | Prepolymer-fluidizer | nil | adhesive |
| 2. | Prepolymer-fluidizer and novolac (25%) | 450 | cohesive |
| 3. | Prepolymer-fluidizer and epoxy-modified novolac (25%) | 800 | cohesive |
| 4. | Prepolymer-fluidizer and resole (10%) | 360 | cohesive |
| | (25%) | 450 | cohesive |

What I claim and desire to protect by Letters Patent is:

1. A thermosetting composition comprising from about 10 to about 50% by weight of a phenol-aldehyde resin and from about 50 to about 90% by weight of a polymer composition comprising a prepolymer of at least one polyacetylenically substituted aromatic compound, said prepolymer having a number average molecular weight of from about 900 to about 12,000, a ratio of aromatic protons to olefinic protons greater than about 2.4 and containing from about 5 to about 20% terminal acetylenic groups by weight of the prepolymer.

2. The composition of claim 1 wherein the prepolymer comprises a polymer of a diethynylbenzene.

3. The composition of claim 2 wherein the polymer of a diethynylbenzene is a copolymer of a diethynylbenzene and phenylacetylene.

4. The composition of claim 1 wherein the polymer composition additionally comprises, as a fluidizer for the prepolymer, from about 2 to about 70%, by weight of the prepolymer, of a monomeric acetylenically substituted aromatic compound having a melting point below about 185°C. and a boiling point above about 250°C.

5. The composition of claim 4 wherein the fluidizer is diphenylbutadiyne.

6. The composition of claim 4 wherein the fluidizer is diphenylacetylene.

7. The composition of claim 1 wherein the phenolaldehyde resin is a novolac resin.

8. The composition of claim 1 wherein the phenolaldehyde resin is a resole resin.

9. The composition of claim 1 wherein the phenolaldehyde resin is an epoxy-modified novolac resin.

10. The composition of claim 1 wherein the amount of phenol-aldehyde resin is from about 10 to about 25% by weight.

11. A thermoset resin obtained by heat curing the composition of claim 1.

12. The process of preparing a thermoset resin essentially free of aliphatic unsaturation which comprises
1. in a first stage (A) preparing a polymer composition by polymerizing at least one polyacetylenically substituted aromatic compound by heating said compound with an aromatization catalyst in an inert organic diluent to a temperature of from about 55° to about 250°C. until from about 30 to about 90% of said compound has been converted to polymer, (B) separating the polymer composition from the polymerization reaction mixture, and
2. in a second stage, (A) combining said polymer composition with a phenol-aldehyde resin, the amount of said resin in the resulting thermosetting composition being from about 10 to about 50% by weight, and (B) heating the thermosetting composition to a temperature of from about 100° to about 300°C.

* * * * *